United States Patent Office 3,508,733
Patented Apr. 28, 1970

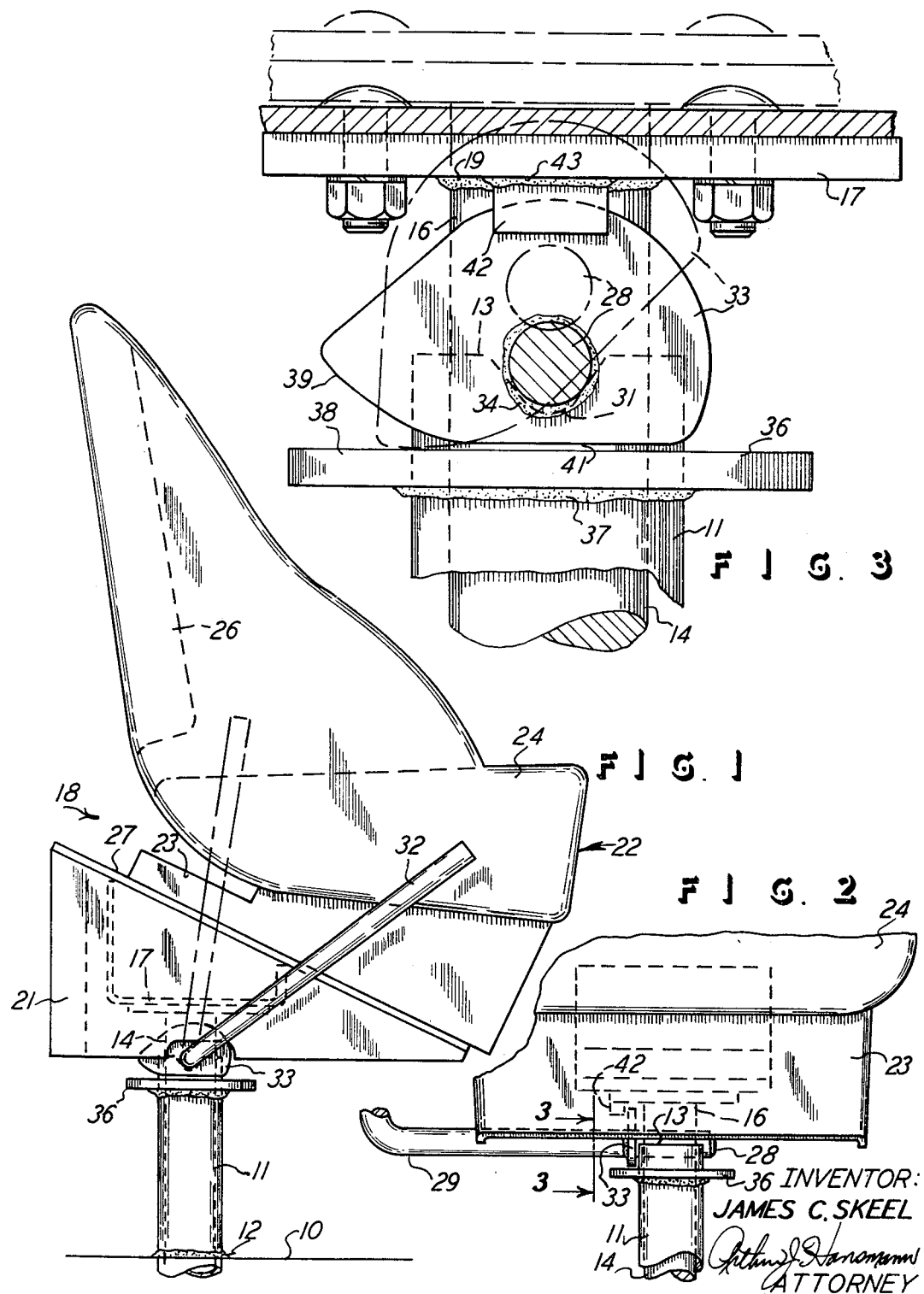

3,508,733
SWIVEL SEAT
James C. Skeel, Terre Haute, Ind., assignor to J. I. Case Company, Racine, Wis., a corporation of Wisconsin
Filed May 20, 1968, Ser. No. 730,386
Int. Cl. F16m 13/00
U.S. Cl. 248—415
5 Claims

ABSTRACT OF THE DISCLOSURE

A swivel seat including a seat portion and a support member rotatably mountable on a pedestal for facing the seat in what may be either a forward facing position or a rearward facing position. A lock connection is effective between the stationary pedestal and the movable support member, and the connection is releasable by a lever which may be operated while the operator is seated in the seat at the time of releasing the lock connection and also during the time of rotating the seat for reverse facing of the seat. A lift member, in the form of a cam in the embodiment shown, is secured to the lever for the release of the lock connection.

BACKGROUND OF THE INVENTION

This invention relates to a swivel seat of the type which may be faced in either a forward facing position or a rearward facing position. This type of seat is particularly applicable in a vehicle of the work-implement type where it is desirable to have the seat facing in one direction for operation of certain vehicle controls, such as a loader bucket or such as the normal driving of the tractor type vehicle. Also, the seat can then be faced in another direction, which may be termed a direction reverse from the forward facing direction, and at this time the seat is then in a position for the operator to occupy it while operating other controls on the vehicle, such as a back hoe.

The prior art is aware of reversible or swivel type seats which are useful in a vehicle for forward facing and for rearward facing, as positioned by the operator. However, these reversible seats are normally manipulated by the operator lifting the seat and rotating it through the one-half turn necessary for the desired basic position. These seats are commonly heavy, and they may normally weigh eighty pounds. Lifting this heavy weight requires exertion and time for the manual manipulations necessary.

Other types of prior art reversible seats have certain forms of levers or like controls and mechanisms for lifting the weight of the seat, but these mechanisms are commonly difficult to operate, occupy floor space on the vehicle, do not lend themselves to simultaneous lifting and rotation of the seat, and are bulky and awkward to manipulate. Additionally, certain prior art structures for either assisting the operator in lifting the seat or in completely lifting the seat itself, are found to be difficult to adjust in order to get the particular positioning of the seat, either in the forward facing position or the rearward facing position, as well as in adjusting the elevation of the seat. Such mechanisms for overcoming the weight of the seat include springs or like lifting mechanisms, and these are subject to installation problems, failure, and they must be either manipulated or overcome by the operator when it is desired to lower the seat to its locked or selected position.

The present invention recognizes the aforementioned problems, and it provides an answer to these problems by providing an improved swivel or rotatable type seat. Specifically, this invention provides a means for securing the seat in the desired facing position, and the same means is utilized for lifting the seat so that it can be rotated to another selected facing position, when desired. Also, in accomplishing this objective, the mechanism employed is not mounted on the floor of the vehicle, so the mechanism is not in the operator's way and not occupying valuable floor space. In fact, the mechanism is virtually entirely disposed beneath the seat in the space between the seat and the floor, except for the portion of the mechanism which is made readily available to the operator for manipulation of the mechanism.

It is also significant to recognize that the mechanism of this invention is both sturdy and reliable, but it is also of only a minimum number of parts, and it can be utilized for manipulation in releasing the lock connection and in rotating the seat, all while the operator is still occupying the seat in a fully seated position.

BRIEF DESCRIPTION OF THE DRAWINGS

FIG. 1 is a side elevational view of a preferred embodiment of this invention.

FIG. 2 is a front elevational view of a fragment of FIG. 1.

FIG. 3 is an enlarged sectional view taken on the line 3—3 of FIG. 2.

DETAILED DESCRIPTION OF THE PREFERRED EMBODIMENT

The swivel or reversible seat of this invention may be mounted in a tractor or other vehicle (not shown) having a floor 10 to which is secured a pedestal in the form of a sleeve or tube 11 affixed to the floor by means of welding 12. The sleeve is therefore uprightly disposed, and it terminates in a top edge 13. A seat support member, in the form of a post 14, is telescopically disposed within the pedestal 11, and the post 14 has its upper end 16 secured to a bracket 17 which is a part of a seat portion generally designated 18. The post 14 is secured to the piece 17 by means of welding 19 shown in FIG. 3.

It will therefore be understood that raising and lowering of the post 14, and rotation of the post 14, both movements being with respect to the pedestal 11, will be the same movements which the seat portion 18 has.

The seat portion 18 also includes the lower section 21, which in turn includes the bracket 17, and the seat portion 18 includes the upper portion 22. The upper portion 22 includes the hardware or frame section 23 and it includes the cushioned seat 24 and the cushioned back 26, both of which support the operator in the usual seated manner. Further, it will be understood by one skilled in the art that the upper portion 22 is adjustable on the lower portion 21 by sliding along a track 27 extending between the two portions. Such arrangement of a sliding track or adjustment is further shown in U.S. Patent application Ser. No. 654,777 filed July 20, 1967, now Patent No. 3,448,-820, and it is also shown in U.S. Patent application Ser. No. 646,078, filed June 14, 1967, now Patent No. 3,437,-373. The lower seat portion 21 is therefore affixed with respect to the post 14, while the upper seat portion 22 slides along the slanted track 27, as desired by the operator in positioning the upper portion 22 by any conventional mechanism for providing and operating a sliding-track type of vehicle seat.

FIG. 1 shows the seat to be faced in one direction, and it will be understood that the seat can be turned one-half turn in either direction of rotation about the common axis extending vertically through the pedestal 11 and the post 14. Also, the seat is secured in both forward and rearward facing positions by means of a lock connection formed by an end portion 28 of a hand manipulable lever 29 and by a notch 31 in the upper edge 13 of the pedestal 11. The end portion 28 is a shaft or pin which extends rotatably through the upper end 16 of the post 14, and the portion 28 nests in the groove 31 which is formed on the diametrically opposite sides of the pedestal upper edge 13. With this arrangement, when the weight of the seat is downward, as shown in all of the views in solid lines, then the lever end portion 28 is secure in the groove or notch 31 to hold the seat in a rotated position, as desired. Of course the same notch or notches 31, and the same pin or end portion 28, are both effective in securing the seat in both the forward facing position and the rearward facing position.

The lever 29 also extends upwardly in a handle portion 32 extending adjacent the upper seat section 22, as shown in FIG. 1. Thus the handle 32 is readily accessible to the operator for rotating the lever 29 in the post 14 to effect raising of the post 14 and the entire seat portion 18, when it is desired to release the lock connection and rotate the seat to the new position.

A lift member, in the form of a cam 33 is affixed to the lever 29 by means of welding 34. The cam or plate 33 therefore rotates with the rotation of the lever 29, when the operator moves the lever handle 32 from the solid line position to the dot-dash line position shown in FIG. 1. FIG. 3 shows the cam 33 then likewise moves from its solid line position to its dot-dash line position during rotation of the lever 29. The pedestal 11 has a plate 36 affixed thereto by means of welding 37, and the plate extends below the cam 33 and provides an abutment surface 38 to the cam arcuate edge 39, during rotation of the lever 29. When the cam 33 moves to the dot-dash line position shown in FIG. 3, the cam 33 is raised at its central portion which receives the lever end portion 28. This action causes the post 14 to be raised, and the entire seat portion 18 is therefore also raised and therefore the lever end portion 28 is raised above the pedestal notches 31, as shown by the dot-dash line position of the lever end portion 28 in FIG. 3. The raised position of the seat portion then permits the seat to be turned one-half turn, in either direction, about the vertical axis of the seat post or support member 14. In this rotation, the cam arcuate surface 39 remains in abutment with the pedestal support or abutment surface 38, so then the entire seat is supported upwardly during the one-half turn or rotation described, unless the lever is released as described later.

It will also be seen that when the seat is in the downward position, that is when the lock connection is effective, then the cam surface 41, and all parts of the cam 33, are clear of the pedestal plate 36, so the weight of the seat and the operator thereon are not acting on the cam 33 at all times. Instead, the seat is evenly balanced sidewise by means of the lever end portion 28 being nested in the two pedestal notches 31, as described.

To guide the cam 33 and prevent it from being withdrawn from operative position, as well as preventing the lever 29 from being withdrawn from the post 14, a stop plate 42 is secured to the seat bracket 17 by means of welding 43. The stop 42 is positioned and available for preventing the cam 33 from being moved laterally beyond the stop 42 in the direction away from the post 14. In this construction, except for the lever hand portion 32, the entire mechanism is disposed completely beneath the seat portion 18 so that it is not mounted on the floor 10 or otherwise located in a position to occupy valuable space or to be in the way. Also, once the operator has raised the lever handle 32 to the dot-dash line position shown in FIG. 1 for releasing the lock connection described, and when he has rotated the seat portion 18 to where the pin or end portion 28 will not engage the notches 31 if lowered, then the operator can release the handle 32 and continue to complete the one-half turn of the seat portion 18, and the lock connection will be automatically made again when the pin portion 28 reaches the notches 31.

What is claimed is:

1. In a swivel seat mountable on the floor and being of the type including a seat portion, a seat portion support member connected to said seat portion and extending therebelow for vertically supporting said seat portion in a position spaced above the floor and including a seat post, a pedestal including a sleeve supportably connected to said support member for rotationally and vertically movably mounting the latter to reverse the facing direction of said seat portion upon raising and rotation of both said support member and said seat portion, a lock connection operatively connected between said pedestal and said support member for securing the latter in selected rotated positions of facing of said seat portion when said support member is in a lowered position on said pedestal, said lock connection being a nested notch and pin combination arranged to be released upon raising said support member on said pedestal, a lever operatively connected to said support member and engageable with said pedestal and having a lift member positionable in operative abutment with said pedestal upon movement of said lever for raising said support member on said pedestal to release said lock connection, said lever including a handle portion extending adjacent said seat portion and the remainder of said lever and said lift member all being disposed in the space between said seat portion and the floor, the improvement comprising the notch of said combination being in the upper end of said sleeve and the pin of said combination rotatably extending through said post and being disposed in said notch and being an end portion of said lever rotatably disposed in said post.

2. The subject matter of claim 1, wherein said lift member is a cam secured to said lever for the raising of said support member upon movement of said lever.

3. The subject matter of claim 1, wherein said lift member is a cam secured to said lever and disposed to one side of said post for rotation with said lever to raise said post and release said lock connection upon rotation of said lever.

4. The subject matter of claim 3, including a stop affixed to said seat portion and extending adjacent said cam on the side thereof opposite said post for restraining said lever against withdrawal from said post.

5. The subject matter of claim 3, wherein said cam is of a size to be clear of a position of operative abutment with said pedestal in one rotated position of said lever and to be in operative abutment with said pedestal in another rotated position of said lever for raising said post on said pedestal and releasing said lock connection.

References Cited

UNITED STATES PATENTS

| 1,666,391 | 4/1928 | Masury | 248—418 |
| 2,334,193 | 11/1943 | Hedeen et al. | 248—418 |
| 2,764,223 | 9/1956 | Mischke | 248—418 |
| 3,190,594 | 6/1965 | Chion | 248—289 |

FOREIGN PATENTS

| 1,237,231 | 6/1960 | France. |

MARION PARSONS, Jr., Primary Examiner

U.S. Cl. X.R.

248—124